Patented Sept. 5, 1944

2,357,412

UNITED STATES PATENT OFFICE 2,357,412

PROCESS FOR CONCENTRATION AND EX-
TRACTION OF FORMIC ACID IN AQUEOUS
SOLUTIONS

Jean Lévesque, Montreal, Quebec, Canada

No Drawing. Application September 21, 1942,
Serial No. 459,186. In Canada July 14, 1942

10 Claims. (Cl. 202—57)

This invention has for its object to provide an improved and more efficient process for concentration and extraction of formic acid from its aqueous solutions, by the particular action of triamylamine under definite conditions. Pure triisoamylamine is a colorless liquid, very slightly soluble in water, with basic properties, has a distillation point of about 242° C. at 760 mm. and a specific gravity of 0.78 at 20° C. Its chemical formula is $(C_5H_{11})_3N$.

I have discovered that triisoamylamine combines more or less completely with formic acid in aqueous solution, giving triisoamylamine monoformate or triisoamylamine diformate or a mixture of both formates depending on temperature, pressure, dilution of formic acid and amount of triisoamylamine added.

If the formic aqueous solution is cold and very dilute and if triisoamylamine is added in equimolecular ratio or in excess thereof to formic acid, the reaction is practically complete and only triisoamylamine monoformate results in that solution; but if the solution is substantially less dilute or less cold, a part of monoformate is transformed into diformate with liberation of triisoamylamine which floats at the surface of the solution. On the other hand, this diformate is subject to a slight hydrolysis thus leading to reformation of some monoformate with liberation of formic acid. Consequently, there is an equilibrum between those two forms of formates in aqueous solution.

If triisoamylamine is added in less than equimolecular ratio to formic acid in aqueous solution, generally speaking, there is more diformate and more free formic acid than if triisoamylamine had been added in equimolecular ratio.

Triisoamylamine combines with anhydrous formic acid and gives only triisoamylamine diformate whatever may be the amount of triisoamylamine added. This diformate distills without decomposition under well reduced pressure, but by distillation under atmospheric pressure it splits partially into formic acid and triisoamylamine.

Consequently, when a cold and dilute aqueous solution of formic acid to which has been previously added triisoamylamine in equimolecular ratio to formic acid, is submitted to distillation under fairly reduced pressure, water distills first practically free of formic acid and the monoformate of triisoamylamine is progressively transformed into diformate with liberation of triisoamylamine which floats at the surface of the solution as being practically insoluble in it; and as its vapor pressure under those conditions is substantially high, triisoamylamine distills with water in large amounts. On the other hand, the diformate thus produced is subject to a slight hydrolysis leading to reformation of monoformate with liberation of formic acid. This hydrolysis, however, is always slight if the distillation is conducted under well reduced pressure, that is, at low temperature; furthermore, the high vapor pressure and the basic properties of triisoamylamine floating at the surface of the solution prevent most of the free formic acid from distilling with water.

When the distillation of water from the solution is almost completed, practically all the monoformate has been transformed into diformate. The temperature rises now very quickly, and if the distillation is conducted under well reduced pressure, this diformate distills without decomposition leaving as residue a certain amount of triisoamylamine which may be used for another extraction. The diformate is now redistilled, but at this time under atmospheric pressure; under these conditions, it splits partially into formic acid and triisoamylamine. However, as the distillation point of formic acid is well below the distillation point of diformate and triisoamylamine, it is easy to allow formic acid to escape separately in a fractionating column; thus the decomposition of diformate becomes more and more complete and finally at the top of the column pure formic acid is recovered while unaltered triisoamylamine is found as residue in the still, practically free of formic acid.

From the industrial point of view it is quite evident that the recovery of triisoamylamine should be substantially quantitative in order that this process should become practical. This is possible for the following reasons:

1. Part of the triisoamylamine distills off with water and traces of formic acid. By adding to this aqueous distillate a slight excess of a cold dilute aqueous solution of sodium hydroxide in order to completely neutralize those traces of acid, triisoamylamine is practically entirely removed from that distillate and floats on the surface. It may therefore be recovered by decantation.

2. Part of the triisoamylamine is found as residue in the fractionating still and part as residue after distillation of the diformate under reduced pressure. Generally speaking, that triisoamylamine has not suffered any alteration and may be used immediately for another extraction.

3. Pure formic acid at the top of the fractionating column does not contain triisoamylamine in practical harmful quantities.

4. No triisoamylamine can go to the vacuum pump if a suitable gas washing apparatus containing cold dilute formic acid is connected between the vacuum pump and the receiver of the distillate.

5. In a non-continuous system any part of the apparatus may be washed with cold dilute formic acid in order to completely remove triisoamylamine from this apparatus.

The fact that triisoamylamine is found unaltered after extraction of formic acid, from the practical point of view, is due to the following reasons.

Triisoamylamine is a tertiary amine bearing in its constitution no other functional groups than the tertiary amine group. Being such, it is hardly susceptible, generally speaking, of substitution or even addition reactions with other organic compounds such as alcohols, aldehydes, ketones, phenols, etc. Moreover, as it does not contain hydroxyl groups it is not susceptible of substitution reactions with acids leading to esters.

Finally, its boiling point, 242° C. at 760 mm., is high enough to allow the decomposition of diformate under atmospheric pressure and low enough to allow the distillation of diformate without alteration under well reduced pressure and to impede destructive distillation and unavoidable reactions with other organic compounds at too high temperature. In fact, even with formic solutions of high complexity, the loss in triisoamylamine due to chemical reactions is practically insignificant.

In summarizing the invention, it may be said that this process is based on: 1. The basic properties of triisoamylamine. 2. Its very slight solubility in water. 3. Its relatively high vapor pressure under definite conditions. 4. The equilibrium which occurs between monoformate and diformate. 5. The distillation of diformate without decomposition under well reduced pressure. 6. The decomposition of diformate by distillation under atmospheric pressure. 7. The great stability of triisoamylamine throughout the process even in the presence of very complex solutions.

Of course, the various isomers of triisoamylamine such as N-triamylamine react with formic acid similarly to triisamylamine and this is also true of various mixtures of those isomers, and, generally speaking, what has been said above of triisoamylamine, must also be said of those isomers or mixtures of them.

Other tertiary amines, containing no other functional groups than the tertiary amine group and substantially insoluble in water such as tributylamine give rise to similar phenomena with formic acid; but the tributylamine diformate is hardly dissociated by distillation under atmospheric pressure; and a superatmospheric pressure should be employed in order to get a good dissociation; consequently, triamylamine seems to be more practical than tributylamine for the concentration of formic acid. Higher amines such as trihexylamine may also be used for concentration of formic acid but their initial cost prohibits the use of them.

The outlines of the process having been described, I will now describe a particular example of this process in accordance with those principles.

To 2000 cc. of a 5% aqueous solution of formic acid, 660 cc. of technical triamylamine are added; that is about the equimolecular ratio of triamylamine to formic acid. The mixture is agitated for a few seconds, after which the reaction of neutralisation is ended. This solution is now submitted to distillation under an absolute pressure of 100 mm. corresponding to a distilling point of water of 52° C. 1910 cc. of water approximately, are thus recovered by distillation, practically free of formic acid, total acidity of this distillate being less than 0.1%. A considerable amount of triamylamine floats at the surface of this distillate and is recovered by decantation.

To this aqueous distillate, 40 cc. of a 5% cold sodium hydroxide aqueous solution are added in order to neutralize its acidity and liberate some triamylamine, which, after a long setting of the solution, floats at the surface of the aqueous distillate, and is thus recovered.

The water-free solution containing triamylamine diformate is now distilled under an absolute pressure of about 20 mm. and practically no distillate appears before the temperature rises to 80° C. Distillation then begins and is continued till the thermometer indicates 120° C.

It is then stopped, the residue being triamylamine practically free of formic acid, which may be returned for a new extraction.

The distillate thus obtained consists mainly of triamylamine diformate together with free triamylamine. By distillation in a fractionating column under atmospheric pressure, it is dissociated into its two components and pure formic acid, practically anhydrous, is recovered at the top of the column, while the final residue in the still consists of free triamylamine which may be returned for a new extraction. Thermometer at the top of the column indicates about 100° C., while, in the still it stands at 180° C. or more. 96 grams of formic acid have been thus recovered in an anhydrous state, from an initial 100 grams in a 5% aqueous solution. 657 cc. of triamylamine have equally been obtained corresponding to a total recovery of about 99.6%. Of course this process, such as explained is susceptible of many variations.

Distillation under reduced pressure may be conducted at various pressures, even at atmospheric pressure, but then the loss in formic acid is higher, about 10% for a 10% solution. The distillation under too high vacuum is very objectionable from the practical point of view. It may however be undertaken.

The residual triamylamine obtained in the fractionating column may be transferred immediately for another extraction. It is however highly advisable to purify it from time to time, by washing with a cold and dilute aqueous solution of sodium hydroxide. This is also true of triamylamine recovered as a residue in the vacuum kettle.

The distillation of diformate under reduced pressure may be omitted, but in view of the purity of formic acid and recovery of triamylamine it is generally advisable to undertake it.

Although specified ingredients and proportions thereof have been named it will be understood that the invention is susceptible of modification within the legal range of equivalents as well as those equivalents specifically mentioned herein.

What I claim is:

1. A process for concentrating aqueous formic acid comprising dehydration and extraction of formic acid by distillation in the presence of triamylamine as a concentrating agent.

2. A process for concentrating aqueous formic acid comprising dehydration and extraction of formic acid by distillation in the presence of triamylamine in a manner to convert the latter into triamylamine monoformate and triamylamine diformate which retain most of the formic acid in the residue, the monoformate being progressively transformed into diformate, during the water distillation period, and distilling the water-free triamylamine diformate under atmospheric pressure in a manner to remove formic acid therefrom as the distillate.

3. A process for concentrating aqueous formic acid comprising adding more than two parts by weight of triamylamine for each part of formic acid, driving off the water from the solution by distillation under an absolute pressure of less than 780 mm. the residue, after distillation of the whole water consisting mainly of triamylamine diformate, adding to the aqueous distillate an alkaline reacting compound capable of neutralizing formic acid, in an amount sufficient to render the resulting solution alkaline, allowing the solution to settle, decanting and recovering the settled triamylamine from the solution, distilling the water-free triamylamine diformate without decomposition under an absolute pressure of less than 760 mm. until the residue contains practically no formic acid, recovering the residual triamylamine, distilling the triamylamine diformate under atmospheric pressure in a fractionating column, recovering the formic acid thus extracted and the triamylamine remaining in the fractionating still.

4. A process for concentrating aqueous formic acid comprising dehydration and extraction of formic acid by distillation in the presence of triamylamine as a concentrating agent in substantially equimolecular relation to the formic acid in solution.

5. A process for concentrating aqueous formic acid comprising adding more than two parts by weight of triamylamine for each part of formic acid, driving off the water from the solution by distillation under an absolute pressure of less than 780 mm., the residue, after distillation of the whole water, consisting mainly of diformate triamylamine, distilling the residual triamylamine diformate under atmospheric pressure in a fractionating column, recovering the formic acid thus extracted and the triamylamine remaining in the fractionating still.

6. A process for concentrating aqueous formic acid comprising adding more than two parts by weight of triamylamine for each part of formic acid, driving off the water from the solution by distillation under an absolute pressure of less than 780 mm., whereby triamylamine monoformate is formed and is converted into the diformate, distilling the residual triamylamine diformate under atmospheric pressure in a fractionating column, recovering the formic acid thus extracted and the triamylamine remaining in the fractionating still.

7. A process for concentrating aqueous formic acid comprising dehydration and extraction of formic acid by distillation in the presence of triamylamine in a manner to convert the latter into triamylamine monoformate and triamylamine diformate which retain most of the formic acid in the residue, converting the monoformate into diformate, and distilling the water free triamylamine diformate under atmospheric pressure in a manner to remove formic acid therefrom as the distillate.

8. A process for concentrating aqueous formic acid comprising adding for each part of formic acid an equimolecular part of triamylamine, driving off the water from the solution by distillation under an absolute pressure of less than 780° mm., the residue, after distillation of the whole water, consisting mainly of triamylamine diformate, distilling the water-free triamylamine diformate without decomposition under an absolute pressure of less than 760 mm. until the residue contains practically no formic acid, distilling the triamylamine diformate under atmospheric pressure in a fractionating column, recovering the formic acid thus extracted and the triamylamine remaining in the fractionating still.

9. A process for concentrating aqueous formic acid comprising adding for each part of formic acid an equimolecular part of triamylamine, driving off the water from the solution by distillation under an absolute pressure of less than 780° mm., whereby triamylamine monoformate is formed and is converted into the diformate, distilling the water-free triamylamine diformate without decomposition under an absolute pressure of less than 760 mm. until the residue contains practically no formic acid, recovering the residual triamylamine, distilling the triamylamine diformate under atmospheric pressure in a fractionating column, recovering the formic acid thus extracted and the triamylamine remaining in the fractionating still.

10. A process for concentrating aqueous formic acid comprising adding for each part of formic acid an equimolecular part of triamylamine, driving off the water from the solution by distillation under an absolute pressure of less than 780 mm. the residue, after distillation of the whole water, consisting mainly of triamylamine diformate, adding to the aqueous distillate an alkaline reacting compound capable of neutralizing formic acid, in an amount sufficient to render the resulting solution alkaline, allowing the solution to settle, decanting and recovering the settled triamylamine from the solution, distilling the water-free triamylamine diformate without decomposition under an absolute pressure of less than 760 mm. until the residue contains practically no formic acid, recovering the residual triamylamine, distilling the triamylamine diformate under atmospheric pressure in a fractionating column, recovering the formic acid thus extracted and the triamylamine remaining in the fractionating still.

JEAN LÉVESQUE.